US009329791B2

(12) United States Patent
Yang et al.

(10) Patent No.: US 9,329,791 B2
(45) Date of Patent: May 3, 2016

(54) FILE SYSTEM AND FILE SYSTEM CONVERTING METHOD

(75) Inventors: Chung Li Yang, Hsinchu Hsien (TW); Tsung-Yueh Lee, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 331 days.

(21) Appl. No.: 12/789,090

(22) Filed: May 27, 2010

(65) Prior Publication Data

US 2010/0306284 A1 Dec. 2, 2010

(30) Foreign Application Priority Data

Jun. 1, 2009 (TW) .............................. 098117964 A

(51) Int. Cl.
*G06F 17/30* (2006.01)
*G06F 3/06* (2006.01)

(52) U.S. Cl.
CPC ............ *G06F 3/0643* (2013.01); *G06F 3/0613* (2013.01); *G06F 3/0674* (2013.01)

(58) Field of Classification Search
USPC .......................... 707/802, 803, 804, 805, 806
See application file for complete search history.

(56) References Cited

U.S. PATENT DOCUMENTS

| | | | | |
|---|---|---|---|---|
| 5,742,818 A | * | 4/1998 | Shoroff et al. | |
| 5,819,298 A | * | 10/1998 | Wong et al. | |
| 6,178,487 B1 | * | 1/2001 | Ruff | G06F 3/0607 711/112 |
| 6,209,057 B1 | * | 3/2001 | Ban et al. | 711/111 |
| 6,253,300 B1 | * | 6/2001 | Lawrence et al. | 711/173 |
| 6,330,653 B1 | * | 12/2001 | Murray | G06F 3/0605 707/E17.01 |
| 6,377,958 B1 | * | 4/2002 | Orcutt | G06F 17/30076 707/690 |
| 6,836,834 B2 | * | 12/2004 | Schulze et al. | 711/200 |
| 2001/0037323 A1 | * | 11/2001 | Moulton et al. | 707/1 |
| 2002/0124133 A1 | * | 9/2002 | Duruoz | G06F 17/30067 711/112 |
| 2003/0191911 A1 | * | 10/2003 | Kleinschnitz, Jr. | G06F 8/63 711/154 |
| 2004/0107309 A1 | * | 6/2004 | Iida et al. | 711/103 |
| 2005/0080985 A1 | * | 4/2005 | Sasaki | G06F 3/0607 711/103 |
| 2006/0095463 A1 | * | 5/2006 | Tsukamoto | 707/102 |
| 2006/0167838 A1 | * | 7/2006 | Lacapra | 707/2 |
| 2007/0112891 A1 | * | 5/2007 | Marriott | G06F 17/30076 |
| 2007/0248029 A1 | * | 10/2007 | Merkey et al. | 370/255 |
| 2008/0025182 A1 | * | 1/2008 | Seo | G11B 20/10 369/85 |

(Continued)

FOREIGN PATENT DOCUMENTS

CN 101051315 A 10/2007
CN 101051315 A * 10/2007

OTHER PUBLICATIONS

First Examination Opinion issued by State Intellectual Property Office of China on Jul. 20, 2011 regarding Chinese Patent Application No. 200910143545.7 (Document Serial No. 2011071500548240).

*Primary Examiner* — Mohammad Rostami
*Assistant Examiner* — Ahmed Abraham
(74) *Attorney, Agent, or Firm* — Edell, Shapiro & Finnan, LLC

(57) ABSTRACT

A file system converting method converts a first file system to a second file system. The first file system manages a storages apparatus via a file allocation table (FAT). The file system converting method includes formatting the FAT to divide the storage apparatus into a plurality of storage units, and establishing a storage unit index table to record information of the plurality of storage units.

18 Claims, 4 Drawing Sheets

(56) References Cited

U.S. PATENT DOCUMENTS

| | | | |
|---|---|---|---|
| 2008/0229035 A1* | 9/2008 | Thayer | G06F 12/0607 711/157 |
| 2009/0063765 A1* | 3/2009 | Kottomtharayil | G06F 3/0619 711/112 |
| 2009/0208189 A1* | 8/2009 | Sasaki | G11B 27/10 386/248 |
| 2009/0276462 A1* | 11/2009 | Inokuchi | G11B 20/00086 |
| 2010/0274795 A1* | 10/2010 | Rallapalli | G06F 17/30545 707/769 |

* cited by examiner

FILE SYSTEM AND FILE SYSTEM CONVERTING METHOD

CROSS REFERENCE TO RELATED PATENT APPLICATIONS

This patent application claims priority from Taiwan Patent Application No. 098117964, filed in the Taiwan Patent Office on Jun. 1, 2009, entitled "File System and File System Converting Method", and incorporates the Taiwan patent application in its entirety by reference.

TECHNICAL FIELD

The present disclosure relates to a file system converting method and a file system for managing a storage apparatus, and more particularly, to a method for converting a file allocation table (FAT) system to a data bulk system.

BACKGROUND OF THE PRESENT DISCLOSURE

In the prior art, an FAT system applied to a storage apparatus serves as a tool for managing storage space and memory data of the storage apparatus. However, when data is accessed via an FAT system, a next available cluster is first searched for with the aid of an FAT index table, which also needs to be updated. Under such a situation, a search time is different according to distribution (or a disk fragmentation) of used and available storage spaces of the storage apparatus. Generally speaking, the more dispersed the storage space is distributed, the longer the search time it takes. Moreover, the FAT index table is searched from a header every time the FAT index table is updated. Therefore, the time-consuming flow cannot meet read/write requirements of an apparatus (e.g., a personal video recorder (PVR)) which needs a fast data read/write speed.

In addition, certain environments supporting the FAT file system provide only one read or write authority to a same file at a time. Therefore, when a write operation is desired on a file which has just been read, the file needs to be first closed and then reopened to perform the write operation, and vice versa. However, the above approach inevitably reduces read/write efficiency of a storage apparatus using the FAT system.

SUMMARY OF THE PRESENT DISCLOSURE

Therefore, one object of the present disclosure is to provide a file system and a file system converting method for generating the file system to overcome disadvantages of having a low search speed and being unable to simultaneously read and write as associated with conventional solutions.

According to an embodiment of the present disclosure, a file system converting method is for converting a first file system to a second file system. The first file system manages a storage apparatus via an FAT. The file system converting method comprises formatting the FAT to divide the storage apparatus into a plurality of storage units, and establishing a storage unit index table for recording information of the plurality of storage units.

According to another embodiment of the present disclosure, a file system for managing file data stored in a storage apparatus comprises an FAT, formatted to a plurality of virtual files to divide the storage apparatus into a plurality storage units for storing data, wherein each of the virtual files corresponds to one of the plurality of storage units; and a storage unit index table, for recording information of the plurality of storage units.

From the above embodiments, a data access speed of a conventional file system is accelerated, and a disadvantage of being unable to simultaneously read and write according to the conventional file system is overcome.

DETAILED DESCRIPTION OF THE PREFERRED EMBODIMENT

In the known art, file allocation table (FAT) system applies an FAT index table (file allocation table) to manage a storage apparatus. Data may be dispersedly stored into a storage apparatus using the conventional FAT system, and the addresses at which the data are stored are recorded in the FAT index table, which will be looked up when accessing a desired data.

In an embodiment of the present disclosure, under the structure of FAT system, file allocation table (FAT index table) is formatted in advance so that storage space of a storage apparatus is divided into a plurality of data bulks in a way that the data bulks can be regarded as different storage units. And a data bulk index table is generated to build a data bulk system for managing the storage apparatus. In other words, the bulk index table is a storage unit index table of the data bulk system of the embodiment in the present disclosure.

Figure 1:
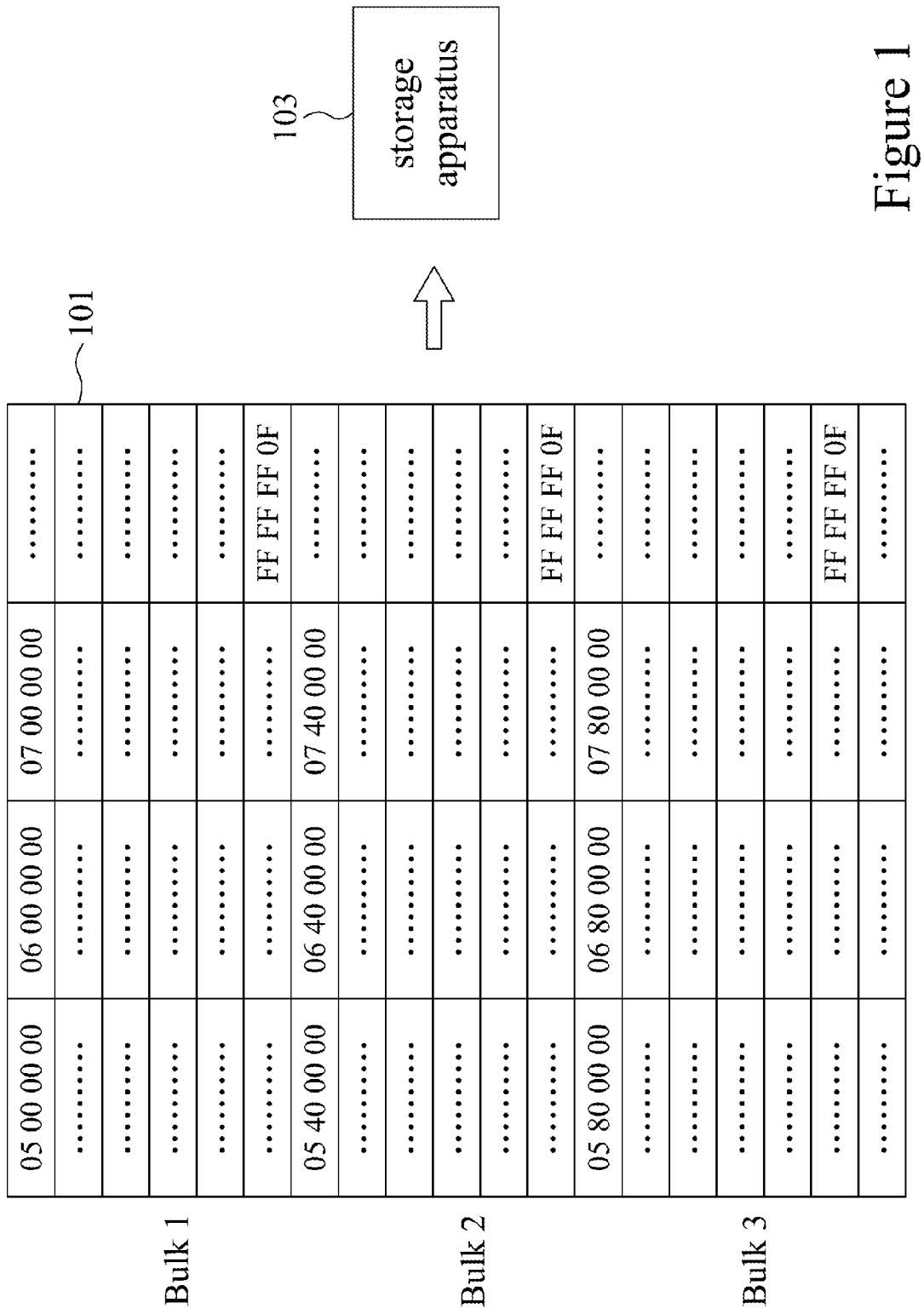
FIG. 1 is a partial schematic diagram of formatting in advance a FAT index table to numerous data bulks by implementing a file system converting method in accordance with the present disclosure.

In particular, in a file system converting method provided by the present disclosure, appropriate values are filled in advance into a FAT index table to establish a plurality of data bulks, each of which is regarded as a file in a FAT system. That is, in the file system converting method provided by the present disclosure, a plurality of files are established in advance in the FAT index table, and each of the files (each of the data bulks) is allocated to a predetermined storage space of the storage apparatus. Therefore, each of the data bulks is regarded as a storage unit. In an embodiment, the data bulks are consecutively distributed in the storage apparatus, and each of the data bulks has a same size, that is, each of the data bulks occupies a storage space of the same size. Although the plurality of files are established in the FAT index table, at the beginning, each of the files in fact does not have any corresponding data in the storage apparatus, i.e., the plurality of files are regarded as virtual files. For example, FIG. 1 shows partial schematic diagram of the data bulks in the FAT index table of the present disclosure. This is achieved by formatting in advance the FAT index table to form a plurality of data bulks by implementing a file system converting method according to the present disclosure. A FAT index table 101, formatted to form a plurality of 64 Mb-sized data bulks, is for managing file data of a storage apparatus 103. After formatting the FAT index table, according to file system converting method of the present disclosure, the next step is generating a data bulk index table to record utilization conditions of the data bulks. The data bulks, the data bulk files and the data bulk index table are described below in detail.

Figure 2:
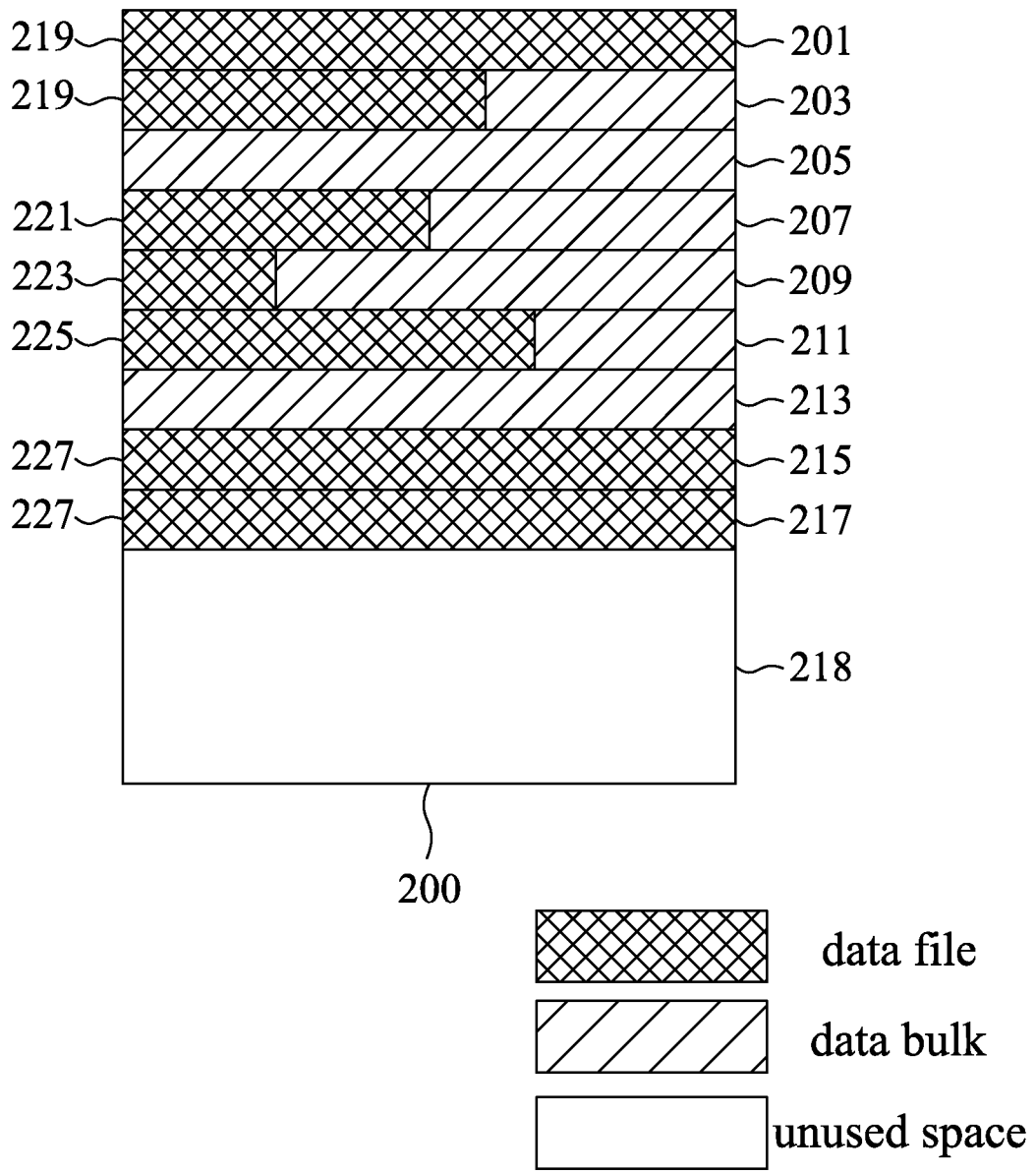
FIG. 2 is a schematic diagram of data bulk files and data bulks in accordance with an embodiment of the present disclosure.

FIG. 2 shows a schematic diagram of data files and data bulks in accordance with an embodiment of the present disclosure. At least one part of a storage space 200 in a storage apparatus is divided into a plurality of storage units, e.g., data bulks 201 to 217; storage space 218 is an unoccupied storage space. The data bulks 201 to 217 are provided in different sizes according to different requirements. Data files 219, 221, 223, 225 and 227 are stored in the data bulks 201 to 217. More specifically, the data file 219 is stored in two consecutive data bulks 201 and 203, the data files 221, 223 and 225 are respectively stored in the data bulks 207 to 211, and the data file 227 is stored in two consecutive data bulks 215 and 217. Accordingly, when a data file needs to be stored in more than two data bulks, the data file is successively stored in two consecutive data bulks instead of being stored dispersedly in a conventional FAT system. Moreover, in the present disclosure, address associated information of the data file is stored in a data bulk index table (storage unit index table), when the file system of the present disclosure is about to access certain data file, it only needs to look up the address information in the data bulk index table instead of searching data files again and again located in dispersed blocks (in other words, searching for different addresses in the system) as what is done in the conventional FAT system. Therefore, the data file system of the present disclosure provides an increase read/write speed of the storage apparatus. In an embodiment, each of the data bulk stores a single data file, i.e., if a data bulk already stores a data file, the data bulk will not be used to store other data files even if this data bulk still has storage space available. When the size of a data file is greater than a capacity of one data bulk, the data file is stored into a plurality of consecutive data bulks.

Figure 3:
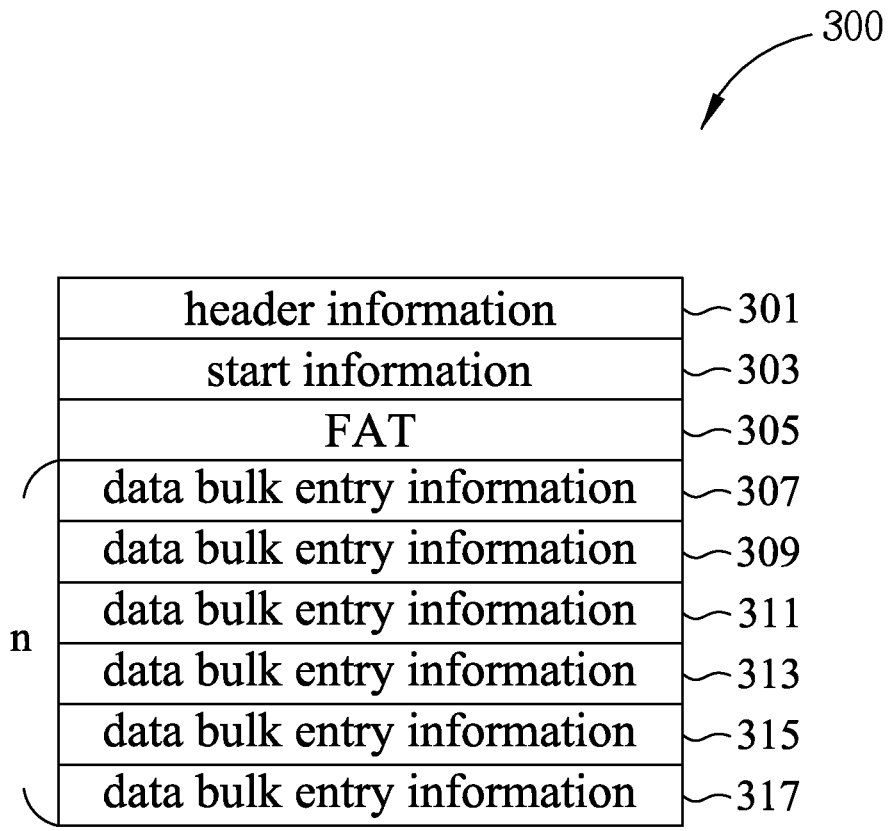
FIG. 3 is a schematic diagram of a data bulk index table in accordance with another embodiment of the present disclosure.

FIG. 3 shows a schematic diagram of a data bulk index table 300 in accordance with an embodiment of the present disclosure. The data bulk table 300 comprises header information 301, start information 303, an allocation table 305, and a plurality of data bulk entry information 307 to 317. In this embodiment, each part of the data bulk index table 300 (storage unit index table) is allocated to have a 4K space, and thus the whole data bulk index table 300 has a space of (3+N)*4K, where number 3 refers number of data bulks that header information 301, start information 303, and allocation table 305 occupy, and, N is number of data bulk entries each recording information of a data file stored in a data bulk. The header information 301 of data bulks is regarded as system information comprising various types of information of a data bulk system, e.g., a total number of data bulks of the data bulk system, a capacity of storage apparatus used by the data bulk system, number of data bulks already stored with data files, etc. The start information 303 records physical information of data bulks (storage units) in the storage apparatus, i.e., corresponding physical sector allocations of the storage apparatus of the data bulks (storage units) divided according to the embodiment of the present disclosure. For example, the start information 303 records the physical addresses of the start points of each of the data bulks in the storage apparatus; or, at which physical sector the data bulk starts.

The file allocation table 305, having associated information of the storage units and the data files, records correlations between the storage units (e.g., the data bulks) and the data files. For example, the file allocation table 305 records a data bulk or data bulks in which each of the data files is stored.

Each of the data bulk entry information 307 to 317 records detailed information of the data file stored in that data bulk. For example, the data bulk entry information 307 to 317 respectively records identification code, file name, file length, operation mode, and the like, of the stored data file.

When a data file is accessed, the data bulk system supports at least two access parameters (e.g., a read pointer and a write pointer) to record an access position of the data file. For example, the read pointer and the write pointer are dynamically stored in the data bulk system, and the access parameters are updated according to a data amount of the data files to be accessed. In particular, before writing the data file, an absolute address (a physical address in the storage apparatus) of the data file is determined by a file search function and the access address of the data file, so as to write the data file into the storage apparatus. Such step is in brief described as Formula 1.

$$\text{accessing sector(s)}=\text{data start sector}+(\text{data bit length}/\text{bits per sector}) \qquad \text{Formula 1}$$

"Sector" means the physical sectors in the storage apparatus. In short, Formula 1 represents that the data to be accessed can be located in the accessing sectors when the data start point and the length of data is provided. From the foregoing step, read and write sectors are calculated by Formula 2 and Formula 3.

$$\text{read sector}=\text{read data start sector}+(\text{read data bit length}/\text{bits per sector}) \qquad \text{Formula 2}$$

$$\text{write sector}=\text{write data start sector}+(\text{write data bit length}/\text{bits per sector}) \qquad \text{Formula 3}$$

According to the foregoing access operations, data file is directly accessed at an absolute position (physical address) instead of having to first search an FAT index to find a next available cluster as in a conventional FAT system, so that the access speed is accelerated. Further, the embodiments of the present disclosure are different from conventional FAT systems where only one read or write authority is provided to a same file at a time, and accordingly it is not necessary to continuously open or close the file, so that a time for accessing the file is reduced.

Figure 4:
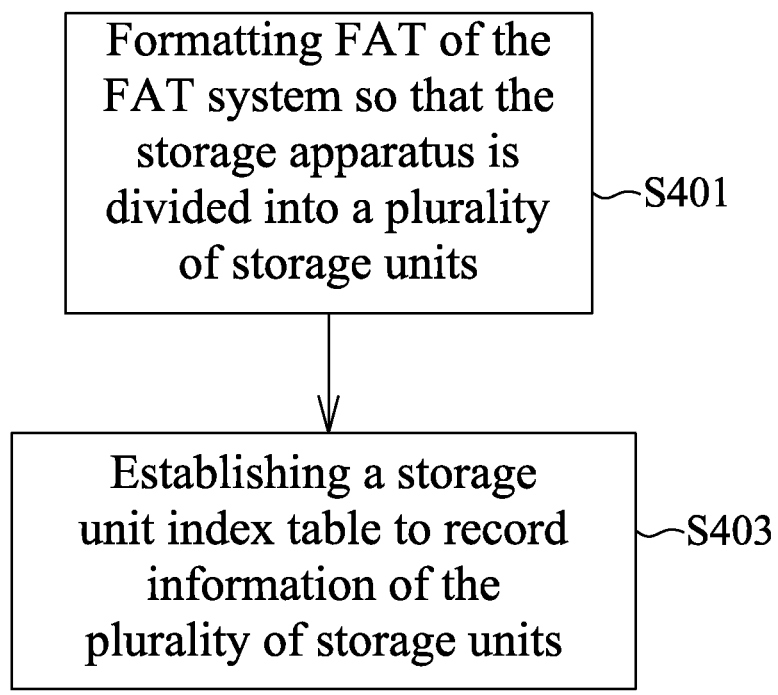
FIG. 4 is a flow chart of a file system converting method in accordance with yet another embodiment of the present disclosure.

FIG. 4 shows a flow chart of a file system converting method in accordance with an embodiment of the present disclosure. In this embodiment, the file system converting method according to the present disclosure, for converting an FAT system to a data bulk system, comprises steps below.

The method includes Step 401, formatting a file allocation table (FAT) of the FAT system to divide a storage apparatus into a plurality of data bulks, each of which being regarded as a storage unit. In this step, a plurality of virtual files is established in the FAT, with each of the virtual files corresponding to one of the storage units.

The method further includes Step 402, establishing a data bulk index table (storage unit index table) to record information of the plurality of storage units. The data bulk index table comprises header information, start information, an allocation table, and a plurality of data bulk entry information.

Detail characteristics of the file system applied in the file system converting method according to the present disclosure are disclosed in the foregoing embodiments, and detailed description thereof shall not be described for brevity. In an embodiment, the foregoing steps are realized from executing predetermined firmware or software by a control circuit (e.g., a processor); however, other circuits can also be implemented to realize the foregoing steps.

According to a file system converting method of the present disclosure, an FAT system is converted to a data bulk system, and a data bulk system of the present disclosure can accelerate a data access speed as well as solving a problem that a file cannot be simultaneously read or written in a conventional FAT system.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A file system converting method used in a storage apparatus, for converting a first file system in the storage apparatus to a second file system, the first file system managing the storage apparatus according to a file allocation table (FAT), the file system converting method comprising:
    formatting the file allocation table so that the storage apparatus is divided into a plurality of storage units;
    allocating the plurality of storage units in the storage apparatus such that a first data file with a size greater than a storage capacity of each of the plurality of storage units is stored in physically consecutive ones of the plurality of storage units and a second data file with a size less than the storage capacity of each of the plurality of storage units is stored in another one of the plurality of storage units so that each of the plurality of storage units is configured to store data from at most a single data file;
    establishing a storage unit index table that records information of at least the physically consecutive storage units of the plurality of storage units that store the single data file; and
    accessing the first data file by directly accessing a first of the physically consecutive ones of the plurality of storage units at a physical address retrieved from the storage unit index table without utilizing a FAT index, and accessing a second of the physically consecutive ones of the plurality of storage units without referencing the storage unit index table,
    wherein a first of the physically consecutive ones of the plurality of storage units is filled with data from the first data file, a second of the physically consecutive ones of the plurality of storage units is partially filled with data from the first data file, and an unfilled portion of the second of the physically consecutive ones of the plurality of storage units is reserved such that no data is stored in the unfilled portions while the first data file is stored in the storage apparatus.

2. The file system converting method as claimed in claim 1, wherein formatting the file allocation table so that the storage apparatus is divided into the plurality of storage units comprises establishing a plurality of virtual files in the file allocation table, each of the plurality of virtual files corresponding to one of the plurality of storage units.

3. The file system converting method as claimed in claim 1, wherein allocating the storage units comprises allocating the storage units to have consecutive storage unit entries such that the first data file is stored consecutively in respective storage unit entries of at least one of the storage units.

4. The file system converting method as claimed in claim 1, wherein formatting the file allocation table comprises allocating the plurality of storage units to have a same storage capacity.

5. The file system converting method as claimed in claim 1, wherein establishing the storage unit index table comprises storing the storage unit index table in one of the storage units that store the first data file when the first data file is stored in consecutive ones of the storage units.

6. The file system converting method as claimed in claim 1, wherein establishing a storage unit index table comprises setting up header information, start information, correlation information, storage unit respective information, or a combination thereof, in the storage unit index table.

7. The file system converting method as claimed in claim 1, further comprising controlling access of the data file by applying at least two access parameters including a read pointer and a write pointer.

8. A file system used in a storage apparatus, for managing file data stored in the storage apparatus, comprising:
    a plurality of storage units that are formed from formatting a file allocation table of a first file system in the storage apparatus;
    a processor configured to store a first data file with a size greater than a storage capacity of each of the plurality of storage units in physically consecutive ones of the plurality of storage units and further store a second data file with a size less than the storage capacity of each of the plurality of storage units in another one of the plurality of storage units so that each of the plurality of storage units is configured to store data from at most a single data file a single data file; and
    a storage unit index table that records information of at least the physically consecutive storage units of the plurality of storage units that store the first data file,
    wherein the processor is further configured to access the single first data file by directly accessing a first of the physically consecutive ones of the plurality of storage units at a physical address retrieved from the storage unit index table without utilizing a FAT index, and accessing a second of the physically consecutive ones of the plurality of storage units without referencing the storage unit index table,
    wherein a first of the physically consecutive ones of the plurality of storage units is filled with data from the first data file, a second of the physically consecutive ones of the plurality of storage units is partially filled with data from the first data file, and an unfilled portion of the second of the physically consecutive ones of the plurality of storage units is reserved such that no data is stored in the unfilled portions while the first data file is stored in the storage apparatus.

9. The file system as claimed in claim 8, wherein the file allocation table comprises a plurality of virtual files stored therein, each of the plurality of virtual files corresponding to one of the storage units.

10. The file system as claimed in claim 8, wherein each of the plurality of storage units has consecutive storage unit entries.

11. The file system as claimed in claim 8, wherein the plurality of storage units have a same storage capacity.

12. The file system as claimed in claim 8, wherein the storage unit index table is stored in one of the plurality of storage units.

13. The file system as claimed in claim 8, wherein the storage unit index table has header information, start information, correlation information, a storage unit respective information, or a combination thereof.

14. The file system as claimed in claim 8, wherein the FAT is applied in a FAT file system.

15. The file system as claimed in claim 8, further comprising at least two access parameters, the file system simultaneously applying the at least two access parameters to control access of data files of the file system.

16. The file system as claimed in claim 15, wherein the at least two access parameters comprise a read pointer and a write pointer recording access addresses.

17. The file system converting method as claimed in claim 1, wherein accessing the first data file directly at a physical address comprises accessing physical sectors in the storage apparatus according to a formula of accessing sector(s)=data start sector+(data bit length/bits per sector).

18. The file system as claimed in claim 8, wherein the processor is configured to access the first data file directly at the physical address by accessing physical sectors in the storage apparatus according to a formula of accessing sector (s)=data start sector+(data bit length/bits per sector).

\* \* \* \* \*